US006536318B1

United States Patent
Bender

(10) Patent No.: US 6,536,318 B1
(45) Date of Patent: Mar. 25, 2003

(54) LOOSE LAMINATION DIE WITH ROTATING BLANKING STATION

(75) Inventor: Mark Bender, Hanover Park, IL (US)

(73) Assignee: Tempel Steel Company, Chicago, IL (US)

( * ) Notice: Subject to any disclaimer, the term of this patent is extended or adjusted under 35 U.S.C. 154(b) by 203 days.

(21) Appl. No.: 09/609,550

(22) Filed: Jul. 3, 2000

(51) Int. Cl.[7] .................................................. B26D 1/00
(52) U.S. Cl. ...................... 83/34; 83/50; 83/55; 83/84; 83/690
(58) Field of Search ............................. 83/50, 55, 690, 83/147, 149, 164, 84, 34

(56) References Cited

U.S. PATENT DOCUMENTS

| | | | | |
|---|---|---|---|---|
| 3,241,755 A | * | 3/1966 | Goodman | 83/34 |
| 3,677,118 A | * | 7/1972 | Abbott et al. | 83/211 |
| 3,712,163 A | * | 1/1973 | Vinson | 83/50 |
| 4,516,450 A | * | 5/1985 | Shuttleworth | 83/146 |
| 4,815,348 A | * | 3/1989 | Ashbolt et al. | 83/383 |
| 5,048,385 A | * | 9/1991 | Eckert et al. | 83/34 |
| 5,136,907 A | * | 8/1992 | Bakermans et al. | 83/93 |
| 5,787,775 A | * | 8/1998 | Stevens et al. | 83/34 |
| 5,794,526 A | * | 8/1998 | Raney | 83/34 |
| 5,881,611 A | * | 3/1999 | Wagner et al. | 83/55 |
| 6,044,742 A | * | 4/2000 | Sakamoto et al. | 83/164 |

* cited by examiner

Primary Examiner—Kenneth E. Peterson
Assistant Examiner—Omar Flores-Sánchez
(74) Attorney, Agent, or Firm—Schiff Hardin & Waite

(57) ABSTRACT

In a method and apparatus for rotating loose laminations in a loose lamination die, a strip is fed through the die to a rotatable blanking chamber of a blanking station. There, a punch engages with a die ring to punch a lamination free from the strip. The rotatable blanking chamber is biased in an upwardly direction. When the punch is not engaging with the die ring, the rotatable chamber is in an upward position wherein a gap develops between laminations retained at a bottom of the rotatable chamber, and those laminations lying directly below the rotatable chamber. The rotatable chamber can then be rotated without damage to the laminations at the gap because of the presence of the gap. Thereafter, a succeeding lamination can be punched after the rotation has occurred. As the punch engages the strip on top of the die ring, the rotatable chamber is pushed downwardly so that the gap at the bottom of the rotatable chamber disappears. A finger joint having an upper and lower portion is provided below the rotatable chamber which permits the gap to develop when the rotatable chamber is biased in the upward direction since the laminations in the upper portion of the finger joint are not tightly held and slide with respect to the upper portion as the upper portion moves upwardly.

8 Claims, 2 Drawing Sheets

LOOSE LAMINATION DIE WITH ROTATING BLANKING STATION

BACKGROUND OF THE INVENTION

The invention relates to a production of cores for electromechanical devices such as motors, and more particularly the production of such cores by stacking of a plurality of laminations.

It is known to produce cores for electromechanical devices such as motors by stacking a plurality of laminations to form stators and matching rotors. Frequently, when forming the rotors or stators by a series of stacked laminations, the laminations are maintained in a loose configuration in a very long stack, thus allowing the motor manufacturer to select a plurality of loose laminations from one end of the stack to form a final stack of a given height for a particular motor application.

It is also known in lamination stacking dies which create finished stacks of a predetermined height to provide a rotatable chamber where the rotors or stators are blanked out so that the laminations of a rotor can be "indexed". Indexing typically refers to one or more of the laminations being rotated by a prescribed angle such as 90 or 180° so that a varying thickness of the steel strip from which the rotors or stators are punched out does not result in a stack having a tilt, that is where one side is higher than the other. By rotating one or more laminations, the stack can be evened out since the indexing will compensate for the varying strip thickness from one side of the strip to the other.

Typically, such indexed lamination stacks are produced in stacking dies where a prescribed stack having a given number of laminations or for a given height is produced. However, in the production of loose laminations wherein no particular given stack height is provided, a difficulty arises in indexing such loose laminations for the following reasons.

High volume production of loose laminations requires the use of a chute attached to the bottom of a die bolster plate in which the laminations travel through after being blanked from the die. Due to the weight of the laminations in the chute, backpressure is created. To keep the chute backpressure from forcing the blank laminations back up through the die opening, "pinch" or "choke" rings are installed in the die. In order to combine loose lamination indexing with part removal by chutes, a separation must be made between the laminations in the indexing chamber and those in the chute to prevent lamination damage from occurring as the index chamber rotates.

SUMMARY OF THE INVENTION

It is an object of the present invention to provide a separation as described above so that loose laminations can be successfully rotationally indexed without causing lamination damage.

According to the present invention, a system and method is provided for rotating one or more laminations relative to other laminations in a loose lamination die. In a punching station for punching laminations free from a strip, a rotatable chamber is, provided. As the punch engages the strip, the rotatable chamber is pushed downwardly. After the lamination has been punched, and as the punch moves upwardly, the rotatable chamber returns to its original upward position. In the upward position, a gap results between laminations retained at the bottom end of the rotatable chamber and laminations just below the bottom of the rotatable chamber. Because of the gap, the rotatable chamber can then be rotated without causing damage to the lamination at the bottom of the rotatable chamber and the lamination just below the rotatable chamber.

DESCRIPTION OF THE PREFERRED EMBODIMENTS

Figure 1:
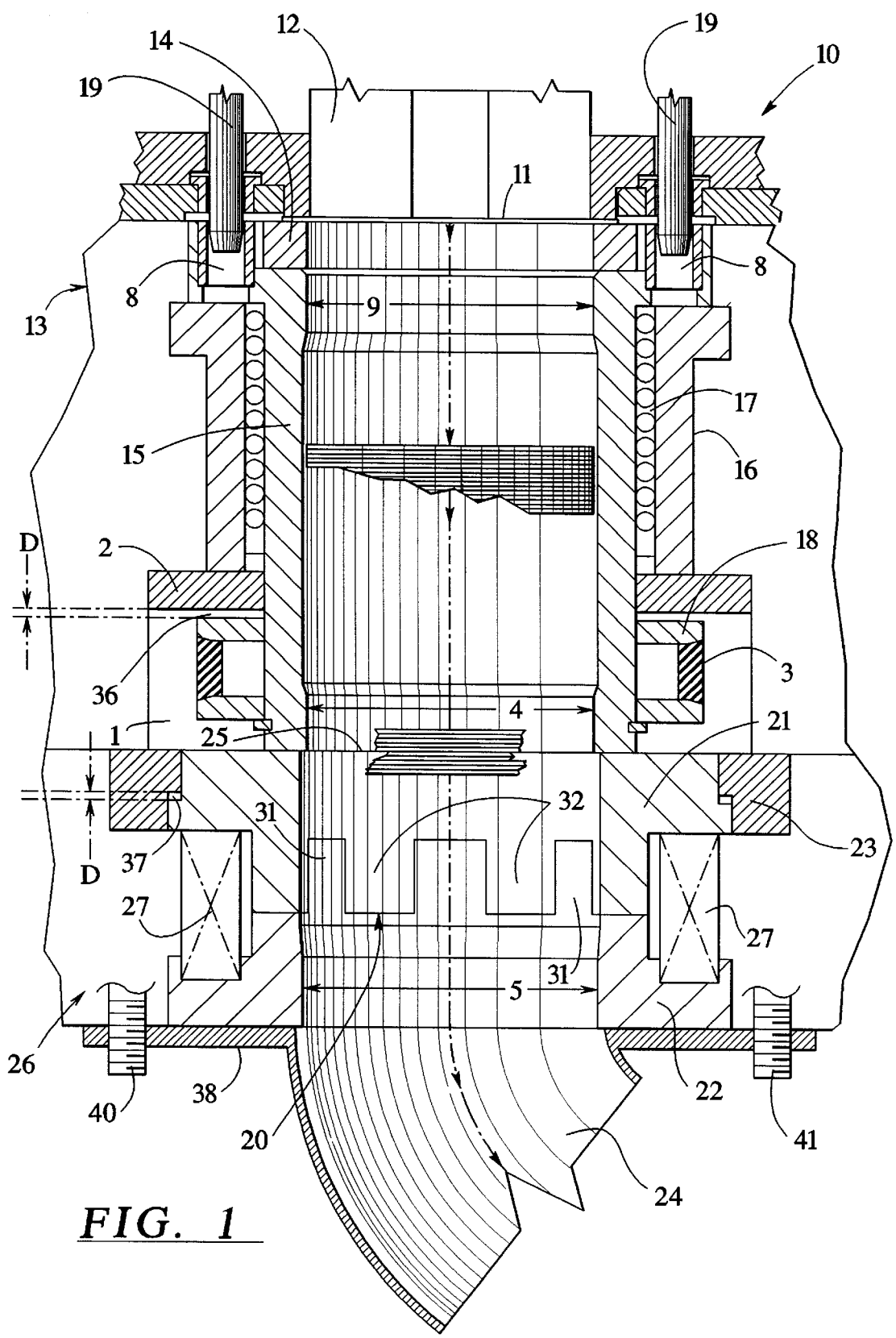
FIG. 1 shows a side cross-sectional view taken through a rotatable chamber of a loose lamination die with the die in the cutting or blanking position.

In the side cross-sectional view of FIG. 1, a rotating blanking station 10 of a loose lamination die is illustrated wherein laminations for rotors or stators are punched out from a steel strip 11. As is known in the art, prior to the final blanking station for the rotor or stator, other operations have already been performed such as blanking out the center hole for the rotor or stator and apertures for slots through which wires may pass.

In FIG. 1, the rotating blanking station 10 is generally illustrated in a side cross-sectional view with a punch 12 in the cutting position for cutting through the strip 11 to produce a rotor or stator lamination. The punch 12 cooperates with a die ring 14 mounted in a rotatable chamber 15 mounted in a die shoe 13 resting on a bolster plate 26 for cutting the rotor or stator free from the steel strip 11. The rotating and blanking station 10 is mounted in the die shoe 13.

The rotatable chamber 15 is provided having an upper pinch zone 9 which provides a pinch fit for the stamped free rotors or stators which accumulate within the upper portion of the index chamber 15. The chamber 15 is mounted in a ball bearing race 16 having a ball bearing cage 17 to radially position, the rotatable chamber. A timing belt pulley 18 is provided driven by a drive belt 3 on the rotatable chamber 15 for rotation thereof.

Chamber pilot pins 19 are received in apertures 8 to align the punch 12 with the die ring 14.

In the bolster plate 26 below the rotatable chamber 15, a finger joint assembly 20 is provided formed of an upper finger joint 21 and a lower finger joint 22 along with an upper finger joint retainer 23. Springs 27 are provided for biasing the upper finger joint 21 away from the lower finger joint 22. The upper finger joint 21 has projecting fingers 32 which intermesh with fingers 31 on the lower finger joint. A chute 24 connects to the bottom of the lower finger joint 22 with a flange 38 and bolts 40 and 41 received in threaded operation in the flange 38.

With the die in the cutting position, the rotatable chamber 15 is pressed downwardly against the action of the springs 27 so that a gap D develops as shown at 36 and 37, thus illustrating the chamber 15 travel distance in the downward direction.

Figure 2:
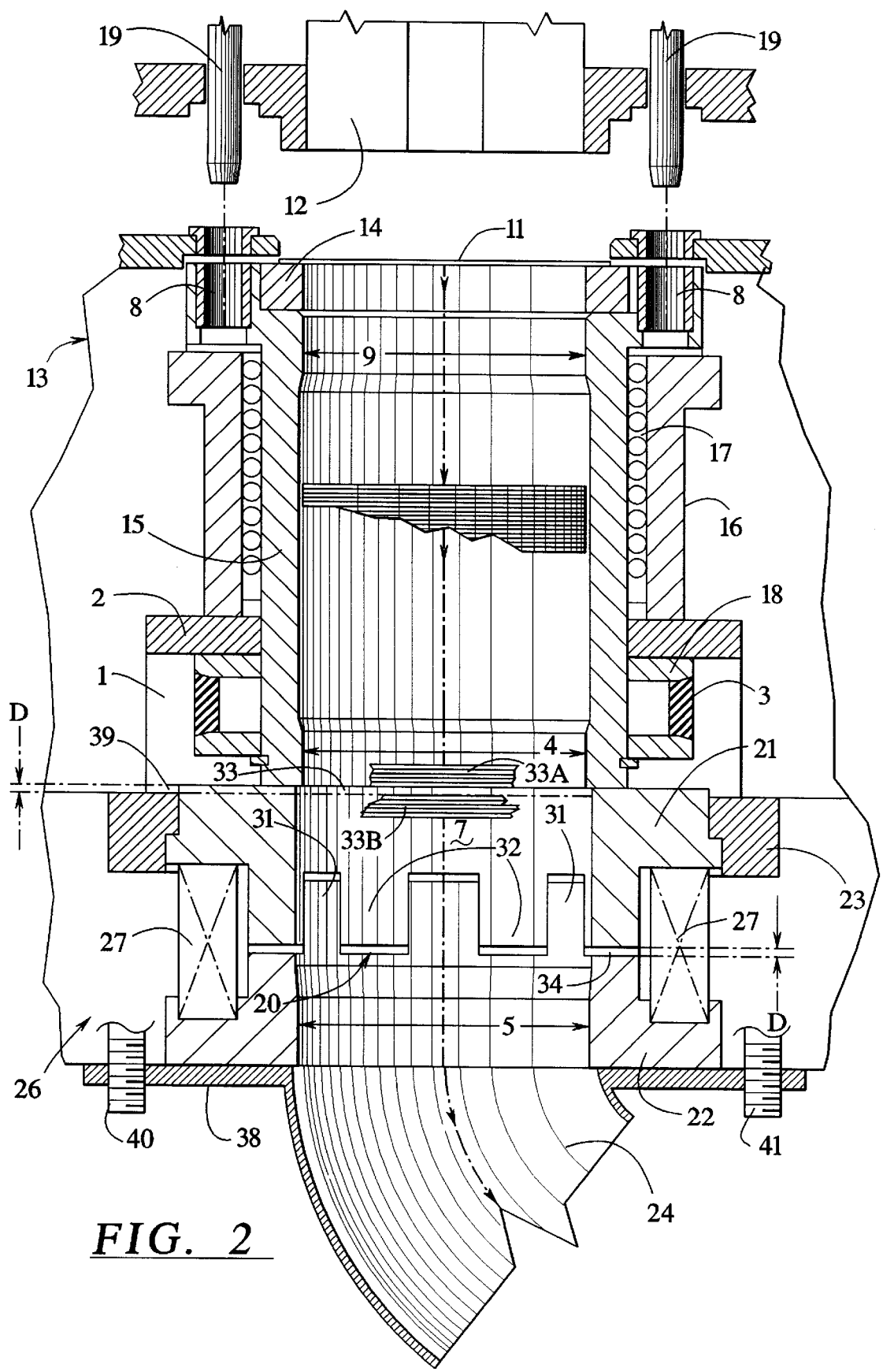
FIG. 2 is the same cross-sectional view as FIG. 1 but with the die in the open position.

As illustrated in FIG. 2, which is the same as FIG. 1 but with the die in the open position (punch 12 spaced upwardly from the die ring 14 with the chamber pilot pins 19 no longer engaging in the corresponding apertures 8), the springs 27 cause the rotatable chamber 15 to move in an upwardly direction by the travel distance D indicated at 34, and 39 until an upper surface of pulley 18 strikes a bottom of a stop surface 2 located at an end wall of a pocket in the die shoe 13. In other words, in FIG. 1 the bottom of the rotatable chamber indicated at 25 is right at the top of the bolster plate 26. However, in FIG. 2, a gap 39 having a spacing D exists which results in a separation zone 33 between lamination stack 33A pinch fit in the pinch zone 4 at the lower portion of rotatable chamber 15, and the lower lamination stack 33B resting but not pinch fit in the wider portion of the inner aperture 7 of the upper finger joint 21. Below this wider portion, in a pinch zone 5 having a narrower diameter, the laminations lying below the lower lamination stack 33B are again retained by a pinch fit prior to entry into the chute 24. Thus, when the rotatable chamber 15 rotates, the separation zone 33 prevents damage to the lamination at the bottom of stack 33A and the lamination at the top of stack 33B.

The method for rotating loose laminations according to the present invention will now be described. First, the progressively stamped strip is positioned over the elevated indexing chamber 15. As the die closes, the pilot pins 19 engage the rotatable chamber 15 to align it properly. As the punch 12 stamps through the strip 11 to blank out the rotor, the chamber 15 is pushed down. The rotor or stator lamination is blanked from the strip 11 during this time. At this point, no separation zone 33 exists between the lamination stack 33A in the rotatable chamber and stack 33B in the finger joint assembly 20 leading to the chute 24 (FIG. 1).

As the press travels in the upstroke (see FIG. 2), spring pressure from springs 27 forces the upper finger joint 21 upwardly. This also forces the rotatable chamber 15 to travel upward within the ball bearing cage 17. The ball bearing cage allows for both radial and vertical movement of the chamber. The amount of this chamber travel may vary based on lamination size and/or configuration.

The pinch area 5 in the lower finger joint 22 keeps the chute backpressure in chute 24 from forcing the lamination stack 33B upward. The pinch zone 4 at the bottom of the index chamber 15 forces the laminations inside the chamber to travel up with the chamber 15 as it moves up. The separations zone 33 in FIG. 2 between the lamination stacks 33A and 33B is then formed at the point where the rotatable chamber 15 meets the upper finger joint 21. The rotatable chamber 15, with pilot pins 19 disengaged with the upward motion of the punch 12, is then indexed via use of a mechanical indexing box or servo motor not shown via the timing belt pulley 18 engaged by belt 3. The separation between the laminations prevents damage between the stationary and rotating laminations.

The process above utilizes a blank-through stamping operation. This invention can also be utilized with a cut-off process (corner trim die) or compounded or pad blank stamping operation.

Although various minor modifications might be suggested by those skilled in the art should be understood that my wish to embody within the scope of the patent warranted hereon all such modifications as reasonably and properly come with the scope of my contribution to the art.

I claim as my invention:

1. A method for operating a lamination die to create core laminations, comprising the steps of:

feeding a strip through the die to a blanking or accumulation station having a rotatable chamber with a die ring at a top thereof;

biasing the rotatable chamber into an upward position prior to rotation of the chamber so that a separation zone occurs between two adjacent laminations;

rotating the rotatable chamber while the separation zone is present; and after the rotating, punching a core lamination from the strip.

2. A method for operating a loose lamination die to create core laminations, comprising the steps of:

a feeding a strip through the die to a blanking station having a rotatable chamber with a die ring at a top thereof;

biasing the rotatable chamber into an upward position prior to rotation of the chamber so that a separation zone occurs between a lamination at a bottom of the rotatable chamber and a lamination just below the bottom of the rotatable chamber;

rotating the rotatable chamber while the separation zone is present; and after the rotating, punching a core lamination from the strip by engaging a punch onto and through the strip and into the die ring to push the rotatable chamber to a downward position so that the separation zone is reduced or eliminated.

3. The method according to claim 2 including the steps of providing a chute beneath the rotatable chamber, providing a joint having an upper portion mating with the lower portion, said upper portion being separable in a vertical direction from the lower portion, providing a pinch zone at a lower end of the rotatable chamber and another pinch zone in the lower portion of the joint so that when said separation zone is present, the first pinch zone holds laminations above the separation zone and laminations lying below the separation zone in the upper portion of the joint slide freely as a bias force is applied to the upper portion to cause said rotatable chamber to move to said upward position.

4. The method according to claim 3 including the step of providing said upper and lower finger portions respective with intermeshing fingers allowing for vertical separation of the upper and lower portions but not permitting the upper and lower portions to rotate relative to each other.

5. The method according to claim 3 including the step of spring biasing the upper portion in a direction for pushing the rotatable chamber in an upwardly direction.

6. The method according to claim 2 including the step of providing a pinch zone at a lower end of the rotatable chamber.

7. The method according to claim 2 including the step of.rotating the rotatable chamber for an indexing.

8. The method according to claim 2 including the step of providing a finger joint comprising an upper finger joint portion beneath the bottom of the rotatable chamber and a lower finger Joint portion meshing with the upper finger joint portion, and providing a pinch zone in the lower finger joint portion and a pinch zone at a bottom of the rotatable chamber, the upper finger joint portion having an internal aperture greater than said pinch zones so that laminations can slide freely therein.

* * * * *